(12) United States Patent　(10) Patent No.: US 12,017,304 B2
Batarseh　(45) Date of Patent: Jun. 25, 2024

(54) LASER SWITCHING APPARATUS AND METHOD

(71) Applicant: Saudi Arabian Oil Company, Dhahran (SA)

(72) Inventor: Sameeh Issa Batarseh, Dhahran Hills (SA)

(73) Assignee: Saudi Arabian Oil Company, Dhahran (SA)

( * ) Notice: Subject to any disclaimer, the term of this patent is extended or adjusted under 35 U.S.C. 154(b) by 121 days.

(21) Appl. No.: 17/561,082

(22) Filed: Dec. 23, 2021

(65) Prior Publication Data

US 2023/0201971 A1　Jun. 29, 2023

(51) Int. Cl.

| | |
|---|---|
| *B23K 26/382* | (2014.01) |
| *B23K 26/06* | (2014.01) |
| *B23K 26/08* | (2014.01) |
| *B23K 26/14* | (2014.01) |
| *E21B 7/15* | (2006.01) |
| *E21B 36/04* | (2006.01) |
| *E21B 37/00* | (2006.01) |
| *E21B 43/11* | (2006.01) |

(52) U.S. Cl.
CPC ........ *B23K 26/389* (2015.10); *B23K 26/0665* (2013.01); *B23K 26/0876* (2013.01); *B23K 26/1462* (2015.10); *E21B 7/15* (2013.01); *E21B 36/04* (2013.01); *E21B 37/00* (2013.01); *E21B 43/11* (2013.01)

(58) Field of Classification Search
CPC .. B23K 26/00; B23K 26/389; B23K 26/1462; B23K 26/0665; B23K 26/0876; B23K 26/326

USPC .............................. 219/121.6, 121.7, 121.84
See application file for complete search history.

(56) References Cited

U.S. PATENT DOCUMENTS

| | | |
|---|---|---|
| 4,090,572 A | 5/1978 | Welch |
| 6,888,097 B2 | 5/2005 | Batarseh |
| 7,416,258 B2 | 8/2008 | Reed et al. |

(Continued)

FOREIGN PATENT DOCUMENTS

| | | |
|---|---|---|
| CN | 203081295 U | 7/2013 |
| WO | 2011077559 A1 | 6/2011 |

(Continued)

OTHER PUBLICATIONS

Batarseh, Sameeh et al.; "Downhole High-Power Laser Tools Development and Evolutions" SPE-193064-MS, AbuDhabi International Petroleum Exhibition & Conference, Abu Dhabi, UAE, Nov. 12-15, 2018; pp. 1-15.

(Continued)

*Primary Examiner* — Nathaniel E Wiehe
*Assistant Examiner* — Alba T Rosario-Aponte
(74) *Attorney, Agent, or Firm* — Bracewell LLP; Constance G. Rhebergen; Brian H. Tompkins

(57) ABSTRACT

A laser head apparatus that enables switching between a laser beam and a purging stream. The laser head apparatus includes a bracket that provides for translation and rotation of the laser optics and purging nozzle. The laser optics and purging nozzle are located on opposite sides of the bracket and may be rotated to different rotational positions around a center axis of the bracket and translated to different linear positions along a length of the bracket. Methods of removing material using the laser head apparatus to between a laser beam and a purging stream are also provided.

7 Claims, 3 Drawing Sheets

(56) References Cited

U.S. PATENT DOCUMENTS

| | | |
|---|---|---|
| 9,168,612 B2 | 10/2015 | Wilkiel et al. |
| 10,273,787 B2 | 4/2019 | Montaron et al. |
| 10,385,668 B2 | 8/2019 | Batarseh |
| 10,941,618 B2 | 3/2021 | Batarseh |
| 2012/0074110 A1 | 3/2012 | Zediker et al. |
| 2014/0158425 A1 | 6/2014 | Bozso et al. |
| 2016/0221125 A1 | 8/2016 | Faircloth et al. |
| 2017/0191314 A1 | 7/2017 | Faircloth et al. |
| 2020/0392793 A1 | 12/2020 | Batarseh |
| 2020/0392818 A1 | 12/2020 | Batarseh |
| 2020/0392824 A1 | 12/2020 | Batarseh et al. |

FOREIGN PATENT DOCUMENTS

| | | |
|---|---|---|
| WO | 2013051611 A | 4/2013 |
| WO | 2018008400 A1 | 1/2018 |
| WO | 2019117869 A1 | 6/2019 |
| WO | 2019117871 A1 | 6/2019 |

OTHER PUBLICATIONS

He, Chao; "High-precision and Complex Geometry Helical Drilling by Adapted Energy Deposition" Dissertation, RWTH Aachen University, Sep. 22, 2020; pp. 1-136.

LASER SWITCHING APPARATUS AND METHOD

BACKGROUND

Field of the Disclosure

The present disclosure generally relates to drilling and the removal of materials, such as in well drilling and completion. More specifically, embodiments of the disclosure relate to the use of lasers to drill and remove materials.

Description of the Related Art

In a first step of the drilling stage in conventional well construction, a mechanical drill bit is used to drill into the formation at an interval of approximately 30 feet. In a second step, the 30 foot section is cased with sections of steel pipe. The steel pipes of the casing can be cemented into place. The steps of drilling and casing can be repeated in 30 foot intervals until the desired well length is reached. After casing installation, completion of the well may include perforating the casing.

The drilling and completion stages in conventional well construction are time consuming and costly. Alternate approaches that allow for greater flexibility are desired. Production, producing fluid from the formation to the surface, can only begin after the drilling and completion stages are finished. Various challenges may occur during these operations; for example, pipes or other tubular structures used during drilling or production may be blocked or plugged due to the build-up of materials inside.

SUMMARY

High powered laser energy may be used for well stimulation and drilling, as well for other applications such as perforation, removal of scale and other materials, formation heating, etc. These applications typically rely on the transfer of heat to materials to weaken the materials (for example, a rock formation) and enable easier removal. The heat from a laser may melt, spall, or vaporize materials such as rocks. However, existing lasers may be unable to remove all of a material or the effectiveness may be limited by the hardness of some materials. Additionally, debris from the removed material may block a laser beam as the debris moves into the path of the beam. For example, FIG. 1 is a schematic diagram 100 illustrating a prior art laser head 102 and laser beam 104. As shown in FIG. 1, the laser beam 104 emitted from the laser head 102 may impact a material and produce debris (shown by arrows 106). As indicated by the arrows 106, some or all of the debris may scatter backward into the path of the laser beam 104. The debris may block some portion or all of the laser beam 104 and reduce the effectiveness of the operation using the laser.

In one embodiment, a laser head apparatus is provided that includes a circular housing and a rotatable bracket concentrically disposed within the circular housing and having a first end and a second end opposite the first end, such that the rotatable bracket defines a length through a center of the circular housing. The laser head apparatus also includes laser optics located at the first end and moveably disposed within the bracket, such that the laser optics are translatable along the length toward the center of the circular housing and the fiber optics are arranged to transform the laser beam to a focused laser beam. Additionally, the laser head apparatus includes a purging fluid nozzle located at the second end and moveably disposed within the bracket, such that the purging fluid nozzle is translatable along the length toward the center of the circular housing.

In some embodiments, the purging fluid includes nitrogen. In some embodiments, the laser head apparatus includes an electric motor, such that the rotatable bracket is coupled to the motor. In some embodiments, the electric motor includes a motor shaft and the rotatable bracket is coupled to the motor shaft, such that rotation of the motor shaft rotates the bracket. In some embodiments, the electric motor includes a motor shaft, such that rotation of the motor shaft causes translation of the laser optics along the length and translation of the purging nozzle along the length. In some embodiments, the electric motor is a first electric motor and the apparatus includes a second electric motor coupled to the bracket. In some embodiments, the laser optics include a lens.

In another embodiment, a method for removing material using a laser is provided. The method includes introducing a first focused laser beam to the material at a first location to remove a portion of the material, such that the focused laser beam is produced by a laser optics, the laser optics disposed in a rotatable bracket within a laser head apparatus. The method also includes introducing a purging fluid to the material at a second location, such that the purging fluid is produced through a purging nozzle, the purging nozzle disposed in a rotatable bracket within a laser head apparatus. Additionally, the method includes rotating the laser optics to the second location and the purging fluid nozzle to the first location and introducing the focused laser beam to the material at the second location to remove a portion of the material. The method further includes introducing the purging fluid at the first location.

In some embodiments, the method includes rotating the laser optics to a third location and the purging fluid nozzle to a fourth location, introducing the focused laser beam to the material at the third location to remove a portion of the material, and introducing the purging fluid at the fourth location. In some embodiments, the method includes rotating the laser optics to the fourth location and the purging fluid nozzle to the third location, introducing the focused laser beam to the material at the fourth location to remove a portion of the material, and introducing the purging fluid at the third location. In some embodiments, the method includes translating the laser optics toward a center of the material to a third location, translating the purging fluid nozzle toward the center of the material to a fourth location, introducing the focused laser beam to the material at the third location to remove a portion of the material, and introducing the purging fluid at the fourth location. In some embodiments, the method includes rotating the laser optics to the fourth location and the purging fluid nozzle to the third location, introducing the focused laser beam to the material at the fourth location to remove a portion of the material, and introducing the purging fluid at the third location. In some embodiments, the purging fluid includes nitrogen. In some embodiments, rotating the laser optics to the second location and the purging fluid nozzle to the first location includes activating an electric motor operatively coupled to the bracket. In some embodiments, the laser optics includes a lens.

In another embodiment, a system is provided that includes a laser unit configured to generate a laser beam and a fiber optic cable optically connected to fiber optics of a laser head apparatus, such that the fiber optic cable is configured to transmit the laser beam to the fiber optics to produce a focused laser beam. The system further includes a purging fluid line connected to a purging fluid source and configured to supply a purging fluid to a purging nozzle of the laser optics assembly. The system also includes a laser head apparatus having a circular housing and a rotatable bracket concentrically disposed within the circular housing and having a first end and a second end opposite the first end, such that the rotatable bracket defines a length through a center of the circular housing. The laser head apparatus further includes the fiber optics, such that the fiber optics are located at the first end and moveably disposed within the bracket. The fiber optics are translatable along the length toward the center of the circular housing and arranged to transform the laser beam to produce the focused laser beam. The laser head apparatus also includes the purging fluid nozzle, such that the purging fluid nozzle is located at the second end and moveably disposed within the bracket. The purging fluid nozzle is translatable along the length toward the center of the circular housing.

In some embodiments, the purging fluid includes nitrogen. In some embodiments, the laser head apparatus includes an electric motor, such that the rotatable bracket is coupled to the motor. In some embodiments, the electric motor includes a motor shaft and the rotatable bracket is coupled to the motor shaft, such that rotation of the motor shaft rotates the bracket. In some embodiments, the electric motor includes a motor shaft, such that rotation of the motor shaft causes translation of the laser optics along the length and translation of the purging nozzle along the length. In some embodiments, the laser optics includes a lens.

In another embodiment, a method for removing material using a laser is provided. The method includes introducing a focused laser beam to the material at a plurality of locations that form a first circular pattern in the material to form remove portions of the material in the first circular pattern and introducing, while introducing the focused laser beam, a purging fluid at a plurality of locations opposite the first plurality of locations, such that the second plurality of locations forms the first circular pattern and each of the second plurality of locations is opposite each of the first plurality of locations. The method also includes introducing a focused laser beam to the material at a third plurality of locations that form a second circular pattern in the material to form remove portions of the material in the second circular pattern, such that the second circular pattern concentric to and inside the first circular pattern. The method further includes introducing, while introducing the focused laser beam, a purging fluid at a fourth plurality of locations opposite the first plurality of locations, such that the third plurality of locations forms the first circular pattern and each of the third plurality of locations is opposite each of the fourth plurality of locations.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a laser head apparatus that combines mechanical and optical components to switch between a laser beam and a purging stream. The laser head apparatus includes a bracket that provides for translation and rotation of the laser optics and purging nozzle (also referred to as a "purging fluid nozzle"). The laser optics and purging nozzle are located on opposite sides of the bracket and may be rotated to different rotational positions around a center axis of the bracket and translated to different linear positions along a length of the bracket.

Embodiments of the disclosure also include a process for removing material using the laser head apparatus. The process includes activating a laser and purging fluid stream at a first position to impact the material via the laser optics and purging nozzle of the laser head apparatus to form a hole in the material at a first location. The process further includes rotating the laser optics and purging nozzle of the laser head apparatus to another position to form another hole at a second location using the laser and to remove material debris at the first location via the purging fluid stream. The rotation and formation of holes in the material may continue until a circular line of holes is created in the material. After creation of a circular line, the laser optics and purging nozzle may be translated inward toward the center axis of the bracket, and a second circular line of holes may be formed in the material. Multiple circular lines may be formed in the material until the desired amount of material is removed.

Figure 1:
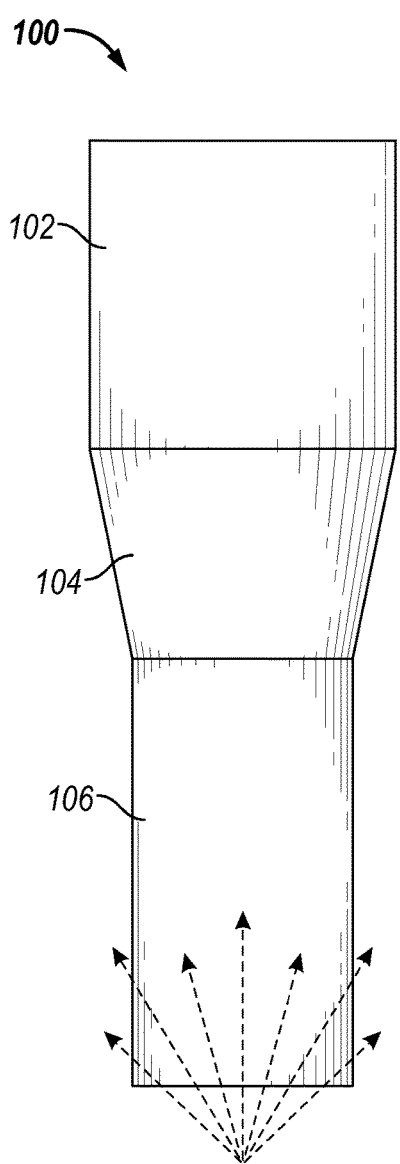
FIG. 1 is a schematic diagram of a prior art laser head.
Figure 2A:
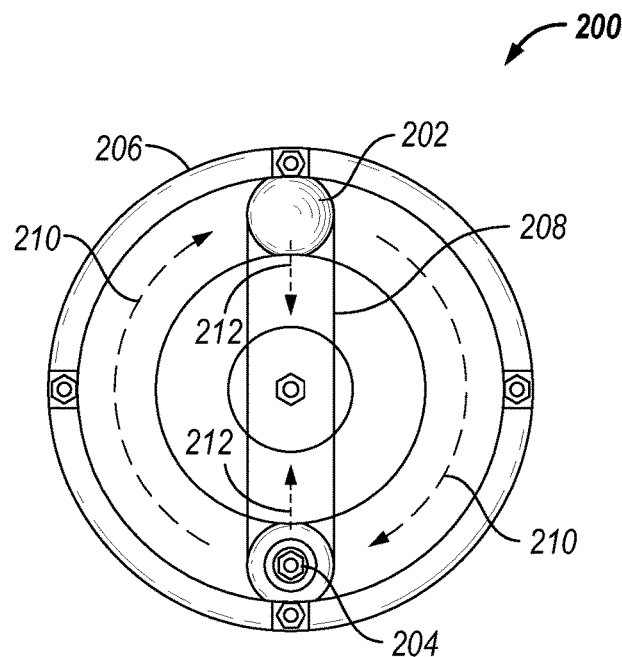
FIGS. 2A and 2B are schematic views of a laser head apparatus having rotatable and translatable laser optics and a purging nozzle in accordance with an embodiment of the disclosure.
Figure 2B:
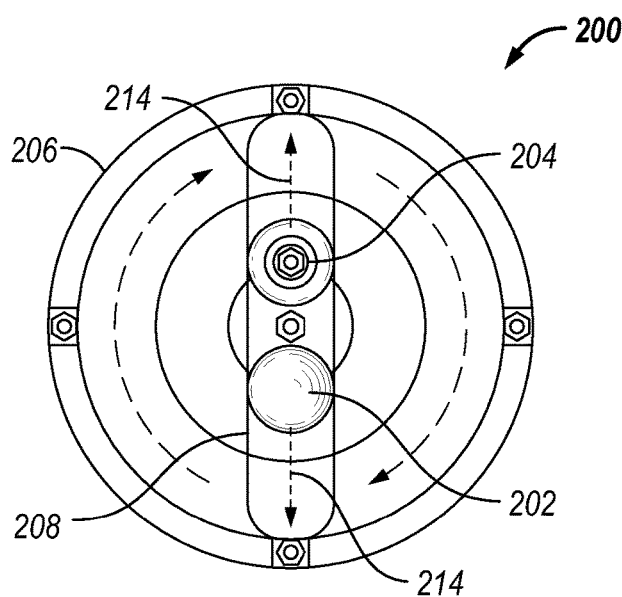

FIGS. 2A and 2B are schematic views of a laser head apparatus 200 having rotatable and translatable laser optics 202 and purging nozzle 204 in accordance with an embodiment of the disclosure. The laser head apparatus 200 includes a generally cylindrical housing 206 that houses a bracket 208 concentrically disposed within the cylindrical housing 206 (that is, such that the center axis of rotation of the bracket 208 generally aligns with the center axis of the cylindrical housing 206). The laser optics 202 and purging nozzle 204 may be moveably coupled to the bracket 208, such as via a sliding rail or track that receives rollers or bearings. As shown in FIGS. 2A and 2B, the laser optics 202 and purging nozzle 204 are mounted in the bracket 208 such that the laser optics 202 is opposite the purging nozzle 204. As used in the disclosure, "opposite" refers to a position 180 degrees around the center axis of the bracket 208 and circular housing 206 of the laser assembly 200. As described in the disclosure, the bracket 208 may be rotatable, such that the bracket 208 rotates within the laser head apparatus 200.

The laser optics 202 may include one or more lenses for shaping or otherwise manipulating a laser beam received by the laser head apparatus 200. For example, in some embodiments the laser optics 202 include a single lens. In other embodiments, the laser optics 202 include two lenses, three lenses, or more lenses. In such embodiments, the lenses may be formed of any material suitable for use in lenses that shape or otherwise manipulate a laser beam. Examples of materials suitable for use in the one or more lenses of laser optics 202 may include glass, plastic, quartz, and crystal. The laser optics 202 may produce various shapes of a laser beam, such as a divergent shape or a focused (that is, convergent) shape. For example, in some embodiments a lens of the laser optics 202 may be referred to as a "focusing lens." In some embodiments, the laser optics 202 may include additional components, such as a collimator, to produce a collimated laser beam. As will be appreciated, a collimator may be combined with the one or more lenses described in the disclosure. The collimator may be formed of any material suitable for collimating a laser beam. By way of example, such materials may include glass, plastic, quartz, and crystal.

The purging nozzle 204 may direct a purging fluid through the laser head apparatus 202 to a target location. As described in the disclosure, purging fluid may be supplied to the purging nozzle via a line coupled to a purging fluid source. The flow of purging fluid may be controlled by a valve or other control device as known in the art. The purging fluid may include nitrogen. In some embodiments, the purging fluid may be nitrogen gas, liquid nitrogen, helium, air, carbon dioxide, or water. In some embodiments, the flow of purging fluid may be controlled by a solenoid and solenoid valve. In such embodiments, the actuator may be an electromagnetic which operates a magnetic field on a plunger or pivoted armature against a spring to open and close the valve to control the purging fluid.

In some embodiments, the bracket 208 may be directly or indirectly coupled to one or more electric motors (for example, a servomotor) that provides mechanical energy to rotate the bracket 208 and translate the laser optics 202 and purging nozzle 204. For example, in some embodiments the bracket 208 is coupled to a rotating shaft that is coupled to a motor shaft of a motor. In some embodiments, the rotating shaft may provide a central axis around which the bracket 208 rotates. In other embodiments, the bracket 208 may be coupled to a rotating shaft or directly to a motor shaft via one or more gears, such that rotation of the rotating shaft or motor shaft causes rotation of the bracket 208.

In some embodiments, the bracket 208 may be coupled to a second electric motor (for example, a servomotor) that converts rotational motion from the motor into the translation of the laser optics 202 and the purging nozzle 204. By way of example, such conversion mechanisms may include a rack and pinion, a leadscrew, or a ball screw. In some embodiments, the bracket 208 may include rollers or bearings that are actuated by a leadscrew or ball screw driven by a motor.

FIGS. 2A and 2B depict the rotation and translation of the laser optics 202 and the purging nozzle 204 enabled by the bracket 208. By way of example, arrows 210 depict one direction of rotation of the bracket 208. As shown in FIG. 2B, the laser optics 202 and the purging nozzle 204 are rotated 180° from the position depicted in FIG. 2A. It should be appreciated that the laser optics 202 and the purging nozzle 204 may be rotated in a direction opposite the direction shown by arrows 210. Moreover, the laser optics 202 and the purging nozzle 204 may be rotated to any position along the circumference defined by the laser head apparatus 200. In some embodiments, the laser optics 202 and the purging nozzle 204 may be rotated every 1°, every 5°, every 10°, every 15°, every 20°, every 25°, or greater.

FIGS. 2A and 2B also depict the translation of the laser optics 202 and the purging nozzle 204 enabled by the bracket 208. Arrows 212 in FIG. 2A show a first direction of translation of the laser optics 202 and the purging nozzle 204 towards the center of the laser head apparatus 200. FIG. 2B depicts the position of the laser optics 202 and the position of the purging nozzle 204 after translation in the direction illustrated by arrows 212. As also shown in FIG. 2B, arrows 214 depict a second direction of translation of the laser optics 202 and the purging nozzle 204 away from the center of the laser head apparatus 200 and in a direction opposite to the direction indicated by arrows 212.

Figure 3:
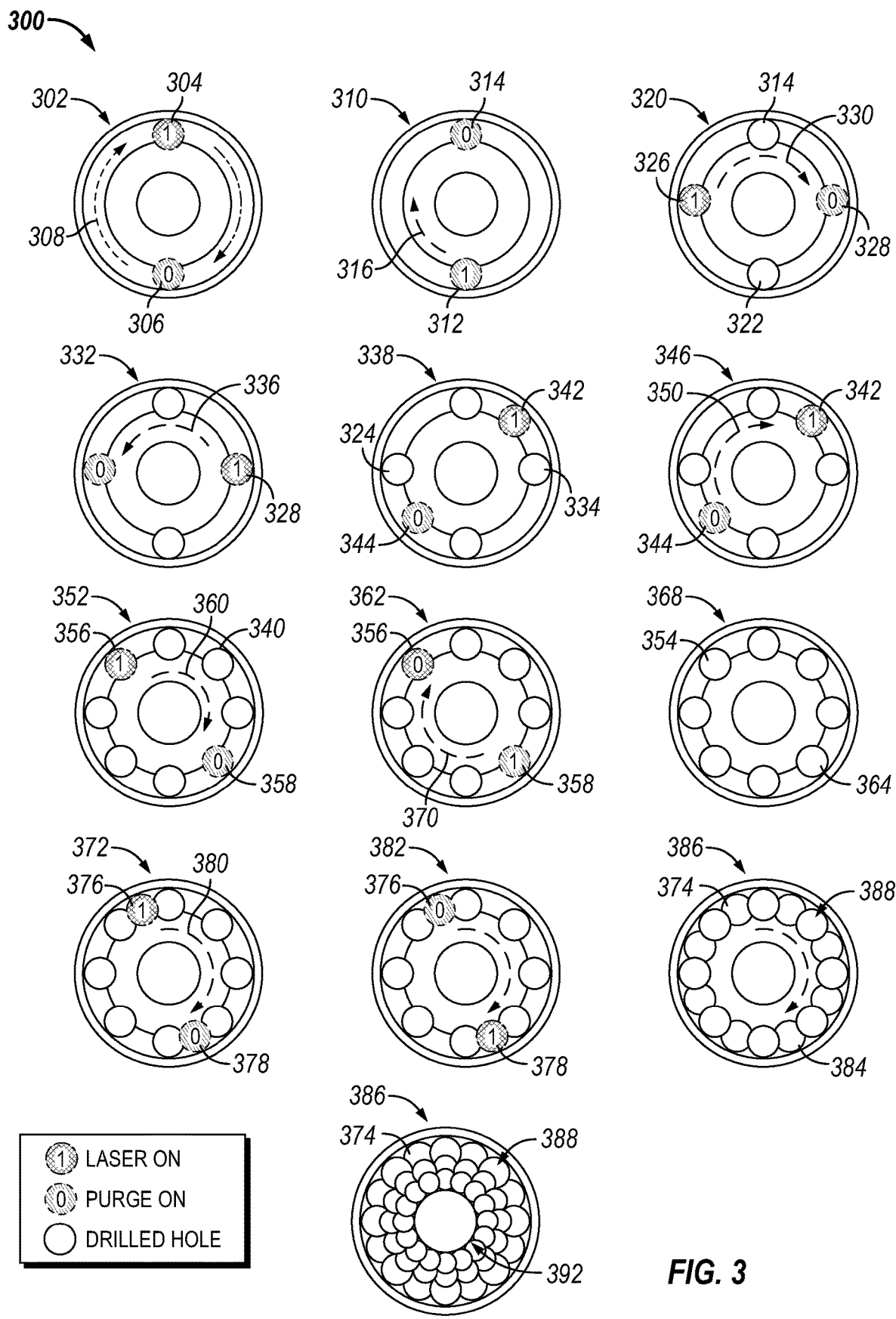
FIG. 3 depicts a sequence illustrating a process for removing material using the laser head apparatus of FIGS. 2A and 2B in accordance with an embodiment of the disclosure.

FIG. 3 depicts a sequence 300 illustrating a process for removing material 302 using the laser head apparatus 200 in accordance with an embodiment of the disclosure. FIG. 3 depicts various example positions of the laser optics 202 and the purging nozzle 204 during the process to remove materials. For example, the sequence 300 may be used to remove material from inside a pipe, drill a hole in a formation, etc. As shown in FIG. 3, the position of the laser optics 202 are illustrated by a "1" with the position of the purging nozzle illustrated by a "0" to differentiate from the holes drilled in the material.

FIG. 3 depicts a first position 302 of the laser optics 202 (shown by a "1" in FIG. 3) and the purging nozzle 204 (shown by a "0" in FIG. 3), in which the laser optics 202 and the purging nozzle 204 are located at the outermost position within the bracket 208 (that is, the position furthest away from the center of the laser head apparatus 200). In the first position 302, both the laser beam and the purging stream are activated. The laser beam heats the material 302 and creates a hole 314 at location 304 in the material 302. The purging stream removes debris generated by the laser and lowers the temperature of the material at location 306. After activation of the laser beam at location 304, the laser optics 202 and the purging nozzle 204 may be rotated 180° in the direction illustrated by arrows 308 by rotation of the bracket 208 to position 310.

Next, in position 310, the laser beam is activated to create a hole 322 in the material at location 312 opposite the hole 314. After activation of the laser beam at location 312, the laser optics 202 and the purging nozzle 204 may be rotated 90° in the direction illustrated by arrows 316 by rotation of the bracket 208 to position 320.

In position 320, holes 314 and 322 have been formed in the material 302. Both the laser beam and the purging stream are activated. The laser beam heats the material 302 and creates a hole 324 at location 326 in the material 302. The purging stream removes debris generated by the laser and lowers the temperature of the material at location 328. After activation of the laser beam at location 326, the laser optics 202 and the purging nozzle 204 may be rotated 180° in the direction illustrated by arrows 330 by rotation of the bracket 208 to position 332.

In position 332, the laser beam is activated to create a hole 334 in the material at location 328 opposite the hole 324. After creation of the hole 334, the laser optics 202 and the purging nozzle 204 may be rotated 45° in the direction illustrated by arrows 336 by rotation of the bracket 208 to position 338.

As shown in FIG. 3, at this step of the sequence holes 314, 322, 324, and 334 have been created in the material 302. In position 338, both the laser beam and the purging stream are activated. The laser beam heats the material 302 and creates a hole 340 at location 342 in the material 302. The purging stream removes debris generated by the laser and lowers the temperature of the material 302 at location 344. After activation of the laser beam at location 342, the laser optics 202 and the purging nozzle 204 may be rotated 180° in the direction illustrated by arrows 344 by rotation of the bracket 208 to position 346.

In position 346, the laser beam is activated to create a hole 348 in the material at location 344 opposite the hole 340. As shown in FIG. 3, at the position 346 the purging nozzle 204 is located at the hole 340 and a purging fluid stream removes debris generated by the laser and lowers the temperature of the material 302 at this location. After creation of the hole 344, the laser optics 202 and the purging nozzle 204 may be rotated 90° in the direction illustrated by arrows 350 by rotation of the bracket 208 to position 352.

As shown in FIG. 3, at this step of the sequence holes 314, 322, 324, 334, 340, and 348 have been created in the material 302. In position 352, both the laser beam and the purging stream are activated. The laser beam heats the material 302 and creates a hole 354 at location 356 in the material 302. The purging stream removes debris generated by the laser and lowers the temperature of the material 302 at location 358. After activation of the laser beam, the laser optics 202 and the purging nozzle 204 may be rotated 180° in the direction illustrated by arrows 360 by rotation of the bracket 208 to position 362.

In position 362, the laser beam is activated to create a hole 364 in the material at location 358 opposite the hole 354. The purging stream a location 356 is activated and removes debris generated by the laser. As shown in FIG. 3 at step 368, holes 314, 322, 324, 334, 340, and 348

After creation of the hole 364, the laser optics 202 and the purging nozzle 204 may be rotated 202.5° (180°+22.5°) in the direction illustrated by arrows 370 by rotation of the bracket 208 to position 372. In position 372, the laser beam heats the material 302 and creates a hole 374 at location 376 in the material 302. The purging stream removes debris generated by the laser and lowers the temperature of the material 302 at location 378. After activation of the laser beam, the laser optics 202 and the purging nozzle 204 may be rotated 180° in the direction illustrated by arrows 380 by rotation of the bracket 208 to position 382.

In position 382, the laser beam is activated to create a hole 384 in the material at location 378 opposite the hole 374. The purging stream a location 376 is activated and removes debris generated by the laser.

The sequence described supra may continue until, as shown in step 386, until a circular line 388 is created in the material 302. The circular line 388 is formed by overlapping the holes created in the material 302 by the laser. The number of holes created may depend on the diameter of the laser beam impacting the material and the circumference of the material at that particular distance from the center. Moreover, the rotational distance (for example, degrees) between each movement of the laser may depend on the number of holes and may be selected to ensure that the circular line 388 is created.

After creation of the circular line, laser optics 202 and the purging nozzle 204 may translate toward the center of the material 302, and another sequence may begin to create a second circular line that overlaps with the first circular line 388. For example, the second sequence may follow the sequence described supra with similar rotations and activations of the laser beam and purging nozzle.

The process of creating a circular line, moving inwards toward the center of the material, creating another circulation line, and so on, may continue until the material 302 is removed. During the process, the power of the laser may be increased or decreased. The completion of the process is shown in step 390 in FIG. 3. As shown in this step, multiple circular lines have been created at various circumferences in the material 302 to complete removal of the material 302. The cooling effect by the purging stream followed by the laser beam breaks the material into small fragments removed by the purging stream during the process.

Figure 4:
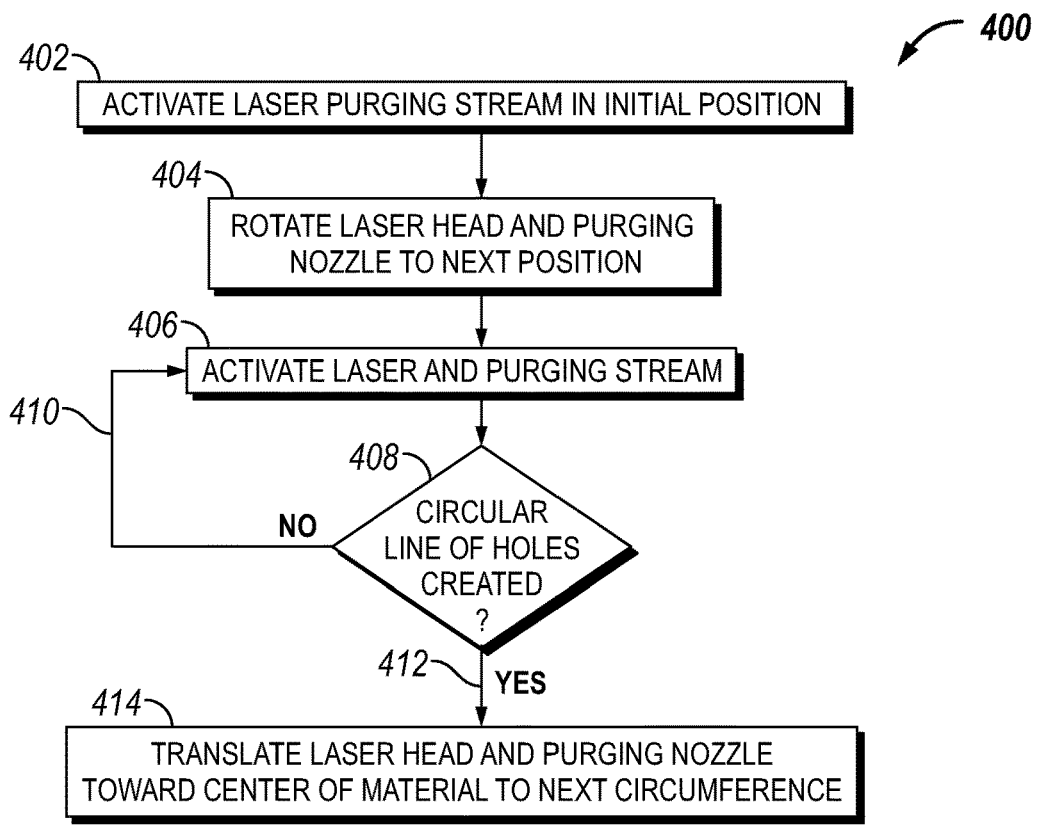
FIG. 4 is a flowchart of a process for operating a laser head apparatus having rotatable and translatable laser optics and a purging nozzle to remove material in accordance with an embodiment of the disclosure.

FIG. 4 depicts a process 400 for operating a laser head apparatus having rotatable and translatable laser optics and a purging nozzle to remove material in accordance with an embodiment of the disclosure. It should be appreciated that the process 400 is described with reference to a circular material, such as material located inside a pipe or other tubular. However, in other embodiments, a process for operating a laser head apparatus having rotatable and translatable laser optics and purging nozzle to remove material may be applied to other shapes of materials, such as rectangular, square, or irregular shapes.

Initially, the laser and purging stream may be activated at an initial position to create a hole in the material (block 402), according to the initial position of the laser optics and purging nozzle. Next, the laser optics and purging nozzle may be rotated to the next position (block 404), and the laser and purging stream may be activated (block 406).

The material may be evaluated to determine if a circular line of holes is created in the material (block 408). If a circular line of holes has not been created (line 410), the laser optics and purging nozzle may be rotated to the next position (block 404). The laser and purging stream may be activated (block 406) to create another hole in the material. The material may be evaluated to determine if a circular line is created in the material (block 410).

If a circular line has been created in the material (line 412), the laser optics and purging nozzle may be translated toward the center of the material (block 414) to enable removal of material at another circumference (that is, along another circular line). The process 400 may begin again with the activation of the laser and purging stream at this initial position (block 402). The process 400 may continue until the material is removed.

In other embodiments, different lines of removed material may be created by the activation, rotation, and translation of the laser optics and purging nozzle in the laser head apparatus. For example, in some embodiments a spiral may be created in a circular material to facilitate removal.

Figure 5:
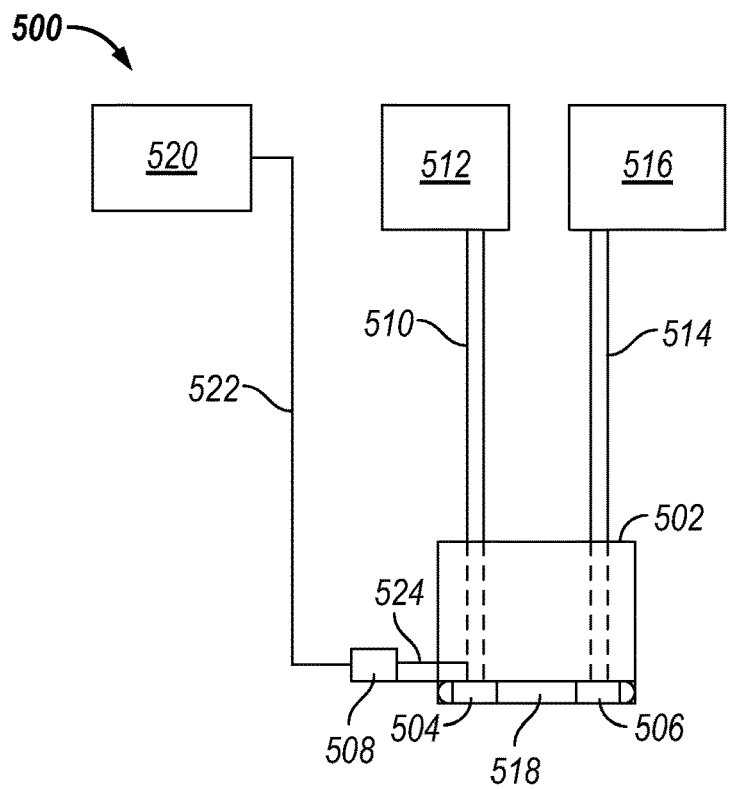
FIG. 5 is a block diagram of a system with a laser head apparatus having rotatable and translatable laser optics and a purging nozzle in accordance with an embodiment of the disclosure.

FIG. 5 is a block diagram of a system 500 with a laser head apparatus 502 having rotatable and translatable laser optics 504 and purging nozzle 506 in accordance with an embodiment of the disclosure. FIG. 5 also depicts an electric motor 508, a fiber optics cable 510, a laser unit 512, a purging fluid line 514, and a purging fluid source 516. As shown in FIG. 5, the laser optics 504 and purging nozzle 506 are disposed in a bracket 518 as described in the disclosure.

The motor 508 may be coupled to a power source 520 via an electrical cable 522. In some embodiments, the laser head apparatus 502 may be deployed downhole, such that some components of the system 500 may be surface units connected to the downhole laser head apparatus 502. In other embodiments, the system 500 may be self-contained system that may be used at the surface to remove material from surface components or components located at the surface (such as after retrieval from a well).

The laser optics 504 may include one or more lenses for shaping or otherwise manipulating a laser beam produced by the laser unit 512. The laser optics 202 may include a single lens or multiple lenses. In such embodiments, the lenses may be formed of any material suitable for use in lenses that shape or otherwise manipulate a laser beam. Examples of materials suitable for use in the one or more lenses of the laser optics 504 may include glass, plastic, quartz, and crystal. The laser optics 504 may produce various shapes of a laser beam, such as a divergent shape or a focused (that is, convergent) shape. For example, in some embodiments a lens of the laser optics 504 may be referred to as a "focusing lens." In some embodiments, the laser optics 504 may include additional components, such as a collimator, to produce a collimated laser beam. In some embodiments, the collimator may be combined with the one or more lenses described in the disclosure. The collimator may be formed of any material suitable for collimating a laser beam. By way of example, such materials may include glass, plastic, quartz, and crystal.

The laser unit 512 can be in optical communication with laser head 504 via fiber optic cable 510. The laser unit 512 may be configured to excite energy to a level above the sublimation point of a material to form a laser beam (not shown). In some embodiments, the laser unit 512 may be tuned to excite energy to different excitation levels as can be required for different formations. The laser unit 512 may be any type of laser unit capable of generating a laser beam and introducing said laser beam into a fiber optic cable. Examples of the laser unit 512 include lasers of ytterbium, erbium, neodymium, dysprosium, praseodymium, and thulium ions.

The fiber optic cable 510 may be any cable containing an optical fiber capable of transmitting a laser beam from the laser unit 512 to the laser head 504. For example, the fiber optic cable 510 may include one or more optical fibers. In an alternate embodiment, one or more fiber optic cables can provide electrical communication between the laser unit 512 and the laser head 504. In at least one embodiment, the fiber optic cable 510 provides a path for light from the laser unit 512 to the laser head apparatus 502. In some embodiments, the fiber optic cable 510 can conduct a raw laser beam from the laser unit 512 to the laser head apparatus 502. A "raw laser beam" as used in disclosure refers to a laser beam that has not been passed through lenses or otherwise focused.

The purging fluid source 516 may provide a purging fluid to the laser head apparatus 502. The purging fluid source 516 is in fluid communication with the laser head apparatus 502 via the purging fluid line 514, such that the purging fluid is delivered to the laser head apparatus 502 from purge fluid source 516. The purging fluid line 514 can be any type of tube capable of supplying a fluid to the laser head apparatus 502. The purging fluid may be nitrogen gas, liquid nitrogen, helium, air, carbon dioxide, or water. The purging fluid may be selected based on the material to be removed and the thermal properties of the material. In some embodiments, multiple fluid lines 514 may be in fluid communication with purging fluid source 516 and the laser head apparatus 502.

In some embodiments, having a downhole application, the fiber optic cable 510, the power cable 522, and the purging fluid line 514 may be enclosed in a protective shaft (not shown). Such a protective shaft may be any material of construction suitable for use in a downhole environment without experiencing mechanical or chemical failure. As used here, "downhole environment" refers to the high operating pressure, high operating temperature, and fluid conditions that can be found in a wellbore extending into a formation.

The power source 520 may be in electrical communication with the motor 508 via the power cable 522. The power source 520 may be any apparatus capable of generating electrical energy and may include a battery. The power cable 522 may be any type of cable suitable for transmitting electrical energy to the motor 508.

The electric motor 508 may include one or more motors that convert electrical energy to mechanical energy to enable mechanical movement of the bracket 518 and the laser optics 504 and the purging nozzle 506. In some embodiments, the motor 508 may include a first motor operatively coupled to rotate the bracket 518 and a second motor operatively coupled to translate the laser optics 504 and the purging nozzle 506. The motor 508 may be coupled to the bracket 518 via coupling mechanism 524. The coupling mechanism 524 may include a first coupling mechanism for a first motor (for example, for rotation of the bracket 518) and a second coupling mechanism for the second motor (for example, for translation of the bracket 518 and the laser optics 504). In some embodiments, the coupling mechanism 524 may include a rotating shaft that is coupled to a motor shaft of the motor 508. In some embodiments, the coupling mechanism may include one or more gears coupled to a motor shaft of the motor 508 and to a rotating shaft or directly to the bracket 518.

In some embodiments, the motor 508 may include a second motor and the coupling mechanism 524 may include a second coupling mechanism that that converts rotational motion from the second motor into translation of the laser optics 202 and the purging nozzle 204. By way of example, the coupling mechanism 524 may include a rack and pinion, a leadscrew, or a ball screw. In some embodiments, the bracket 518 may include rollers or bearings that are actuated by a leadscrew or ball screw driven by a motor.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A laser head apparatus, the apparatus comprising:
   a circular housing;
   a rotatable bracket concentrically disposed within the circular housing and having a first end and a second end opposite the first end, the rotatable bracket defining a length through a center of the circular housing;
   laser optics located at the first end and moveably disposed within the bracket, wherein the laser optics are translatable along the length toward the center of the circular housing, the laser optics arranged to transform the laser beam to a focused laser beam; and
   a purging fluid nozzle located at the second end and moveably disposed within the bracket, wherein the purging fluid nozzle is translatable along the length toward the center of the circular housing.

2. The apparatus of claim 1, wherein the purging fluid comprises nitrogen.

3. The apparatus of claim 1, comprising an electric motor, wherein the rotatable bracket is coupled to the motor.

4. The apparatus of claim 3, wherein the electric motor comprises a motor shaft and the rotatable bracket is coupled to the motor shaft, such that rotation of the motor shaft rotates the bracket.

5. The apparatus of claim 1, wherein the electric motor comprises a motor shaft, such that rotation of the motor shaft causes translation of the laser optics along the length and translation of the purging nozzle along the length.

6. The apparatus of claim 4, wherein the electric motor is a first electric motor and the apparatus comprises a second electric motor coupled to the bracket.

7. The apparatus of claim 1, wherein the laser optics comprise a lens.

* * * * *